US012384988B2

(12) United States Patent
Schwab et al.

(10) Patent No.: US 12,384,988 B2
(45) Date of Patent: Aug. 12, 2025

(54) METHOD AND COMPOSITION FOR REMOVING A LANDFILL RESIDUE

(71) Applicant: Kroff Landfill Technologies, Inc., Pittsburgh, PA (US)

(72) Inventors: David Earl Schwab, Renfrew, PA (US); Jacob Nicholas Very, Coraopolis, PA (US)

(73) Assignee: Kroff Landfill Technologies, Inc., Pittsburgh, PA (US)

( * ) Notice: Subject to any disclaimer, the term of this patent is extended or adjusted under 35 U.S.C. 154(b) by 607 days.

(21) Appl. No.: 17/835,043

(22) Filed: Jun. 8, 2022

(65) Prior Publication Data

US 2022/0403299 A1 Dec. 22, 2022

Related U.S. Application Data

(60) Provisional application No. 63/208,935, filed on Jun. 9, 2021.

(51) Int. Cl.

| | |
|---|---|
| ***C11D 3/33*** | (2006.01) |
| ***B08B 9/027*** | (2006.01) |
| ***C11D 1/75*** | (2006.01) |
| ***C11D 3/20*** | (2006.01) |
| ***C11D 3/36*** | (2006.01) |
| ***C11D 3/39*** | (2006.01) |

(52) U.S. Cl.

CPC .............. *C11D 3/361* (2013.01); *B08B 9/027* (2013.01); *C11D 1/75* (2013.01); *C11D 3/2086* (2013.01); *C11D 3/33* (2013.01); *C11D 3/364* (2013.01); *C11D 3/3942* (2013.01); *B08B 2209/027* (2013.01); *B08B 2220/04* (2013.01); *C11D 2111/20* (2024.01)

(58) Field of Classification Search

CPC ......... C11D 3/361; C11D 1/75; C11D 3/2086; C11D 3/33; C11D 3/364; C11D 3/3942; C11D 2111/20; B08B 9/027; B08B 2209/027; B08B 2220/04

See application file for complete search history.

(56) References Cited

U.S. PATENT DOCUMENTS

| | | | | |
|---|---|---|---|---|
| 5,486,068 | A | 1/1996 | Wilson | |
| 5,605,417 | A | 2/1997 | Englert et al. | |
| 5,674,176 | A * | 10/1997 | Pierce | A62D 3/33 588/256 |
| 6,283,676 | B1 | 9/2001 | Hater et al. | |
| 8,287,625 | B2 | 10/2012 | Casella | |
| 8,313,921 | B2 | 11/2012 | Kraemer et al. | |
| 2011/0236961 | A1 * | 9/2011 | Casella | B01D 53/78 405/129.27 |
| 2012/0271091 | A1 * | 10/2012 | Manno, Jr. | C04B 28/18 405/129.95 |
| 2021/0268560 | A1 * | 9/2021 | Manno, Jr. | E02D 31/006 |
| 2022/0403299 | A1 * | 12/2022 | Schwab | C11D 1/75 |

* cited by examiner

*Primary Examiner* — Sharidan Carrillo

(74) *Attorney, Agent, or Firm* — Alan G. Towner; Leech Tishman Fuscaldo & Lampl

(57) ABSTRACT

The present invention relates to a method of removing a landfill residue that includes (a) forming a treatment composition that includes, (i) an acid functional material comprising at least one of carboxylic acid functional materials, phosphoric acid functional materials, phosphonic acid functional materials, or salts thereof, (ii) water, (iii) optionally an oxidizer including a reactive oxygen, and (iv) optionally a surfactant. The method further includes (b) contacting together said treatment composition and said landfill residue, thereby forming a modified treatment composition including the landfill residue, and (c) removing the modified treatment composition. The landfill residue is selected from a landfill gas extraction residue and a landfill leachate collection residue, and the landfill residue includes an organic substance and optionally a scale-forming salt. The present invention also relates to a treatment composition including the acid functional material, and the oxidizer.

24 Claims, No Drawings

METHOD AND COMPOSITION FOR REMOVING A LANDFILL RESIDUE

CROSS-REFERENCE TO RELATED APPLICATIONS

This application claims the benefit of U.S. Provisional Patent Application Ser. No. 63/208,935, filed on Jun. 9, 2021, which is incorporated herein by reference.

FIELD OF THE INVENTION

The present invention relates to a method and composition for removing a landfill residue that includes an organic substance and optionally a scale-forming salt, such as landfill gas extraction residue and/or landfill leachate collection residue, in which the method involves contacting a treatment composition that includes an acid functional material and water with the landfill residue, thereby forming a modified treatment composition that includes the landfill residue, and removing the modified treatment composition.

BACKGROUND OF THE INVENTION

Landfills, such as used for the collection of municipal solid waste, typically generate landfill gas, which includes methane. The landfill gas typically results from the bacterial decomposition of waste within the landfill under anaerobic conditions. Landfill gas typically includes about 50 to 55 percent methane, 45 to 50 percent carbon dioxide, less than 1 percent of non-methane organic compounds, and trace amounts of inorganic compounds. The methane and carbon dioxide of landfill gas are greenhouse gasses, with methane being a more potent greenhouse gas than carbon dioxide. As such, the collection of landfill gas is desirable at least for reasons of limiting the amount of greenhouse gasses emitted from a landfill directly into the atmosphere. The methane of the collected landfill gas can be flared or further isolated and used as a fuel, such as for electric power generation. A landfill gas collection system typically includes a landfill gas extraction pipe including a perforated section that extends beneath the surface of the landfill, and up through which landfill gas passes and is collected and removed at the wellhead thereof, which resides above the surface of the landfill.

Landfills, such as used for the collection of municipal solid waste, typically have associated therewith landfill leachate. Landfill leachate is a liquid that results from water, typically rain water, percolating through the landfill, and can include dissolved and/or suspended organic and/or inorganic materials. If landfill leachate escapes from the landfill, it can contaminate ground water, including wells, and/or surface water, including lentic and/or lotic waters. Landfill leachate is typically collected and removed from the landfill by a landfill leachate collection system. The collected landfill leachate is typically subjected to treatment prior to further use and/or disposal thereof. A landfill leachate collection system typically includes a landfill leachate pipe having a perforated section that extends beneath the surface of the landfill, and up through which landfill leachate is drawn, and collected and removed at the head thereof. The landfill leachate pipe may run along the bottom floor of the landfill and may be covered by gravel packing.

The landfill gas extraction pipe of a landfill gas extraction system can become occluded with a landfill residue. Similarly, the landfill leachate pipe of a landfill leachate collection system can become occluded with a landfill residue. The landfill residue can result from the bacterial decomposition of waste within the landfill. Occlusion of the landfill gas extraction pipe with a landfill residue can minimize or prevent the passage of landfill gas up through the pipe, impede gas flow and/or extraction, and result in the emission of extraneous landfill gas directly into the atmosphere. Occlusion of the landfill leachate pipe with a landfill residue can minimize or prevent the passage of landfill leachate up through the landfill leachate pipe, and result in leachate escaping from the landfill and contaminating ground water and/or surface water.

The landfill residue, in some instances, is a solid or semisolid material, which can be difficult to remove, such as from the interior of a landfill gas extraction pipe and system and/or landfill leachate pipe and system. In some instances, typical pipe cleaning methods, such as pigging, pipeline snakes, and high-pressure fluid jet cleaners, are not easily applicable for purposes of removing landfill residue for reasons including the amount of time and energy involved and difficulties associated with collecting and discarding the removed landfill residue.

It would be desirable to develop new methods of and compositions for removing landfill residue, such as from the interior of landfill gas extraction pipes and/or landfill leachate collection pipes. It would be further desirable that such newly developed methods and compositions provide for the efficient collection and removal of landfill residue.

SUMMARY OF THE INVENTION

In accordance with the present invention, there is provided a method of removing a landfill residue comprising: (a) forming a treatment composition comprising, (i) an acid functional material comprising at least one of carboxylic acid functional materials, phosphoric acid functional materials, phosphonic acid functional materials, or salts thereof, (ii) water, (iii) optionally an oxidizer comprising a reactive oxygen, and (iv) optionally a surfactant. The method of the present invention further comprises, (b) contacting together the treatment composition and the landfill residue, wherein the landfill residue is selected from a landfill gas extraction residue and a landfill leachate collection residue, and wherein the landfill residue comprises an organic substance and optionally a scale-forming salt, thereby forming a modified treatment composition comprising the landfill residue. The method of the present invention additionally comprises, (c) removing the modified treatment composition.

In accordance with the present invention, there is also provided a treatment composition that removes a landfill residue, in which the treatment composition comprises: (i) an acid functional material comprising at least one of carboxylic acid functional materials, phosphoric acid functional materials, phosphonic acid functional materials, or salts thereof; and (ii) an oxidizer comprising a reactive oxygen. With the composition of the present invention, the landfill residue is selected from a landfill gas extraction residue and a landfill leachate collection residue, and the landfill residue comprises an organic substance and optionally a scale-forming salt.

The features that characterize the present invention are pointed out with particularity in the claims, which are annexed to and form a part of this disclosure. These and other features of the invention, its operating advantages and the specific objects obtained by its use will be more fully understood from the following detailed description in which non-limiting embodiments of the invention are illustrated and described.

DETAILED DESCRIPTION OF THE INVENTION

As used herein, the articles "a," "an," and "the" include plural referents unless otherwise expressly and unequivocally limited to one referent.

Unless otherwise indicated, all ranges or ratios disclosed herein are to be understood to encompass any and all subranges or subratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to, 1 to 6.1, 3.5 to 7.8, and 5.5 to 10.

Other than in the operating examples, or where otherwise indicated, all numbers expressing quantities of ingredients, reaction conditions, and so forth used in the specification and claims are to be understood as modified in all instances by the term "about."

As used herein, the term "polymer" means homopolymers (e.g., prepared from a single monomer species), copolymers (e.g., prepared from at least two monomer species), and graft polymers.

As used herein, the term "(meth)acrylate" and similar terms, such as "(meth)acrylic acid ester" means methacrylates and/or acrylates. As used herein, the term "(meth) acrylic acid" means methacrylic acid and/or acrylic acid.

As used herein, recitations of "linear or branched" groups, such as linear or branched alkyl, are herein understood to include: a methylene group or a methyl group; groups that are linear (or "straight"), such as linear $C_2$-$C_{20}$ alkyl groups; and groups that are appropriately branched, such as branched $C_3$-$C_{20}$ alkyl groups.

As used herein, recitations of "substituted" group, and related recitations, such as "optionally substituted" group, means a group, including but not limited to, alkyl group, cycloalkyl group, and/or aryl group, in which at least one hydrogen thereof has been replaced or substituted (or optionally replaced or substituted) with a group that is other than hydrogen, such as, but not limited to: halo groups (e.g., F, Cl, I, and Br); hydroxyl groups; ether groups; thiol groups; thio ether groups; carboxylic acid groups; carboxylic acid ester groups; phosphoric acid groups; phosphoric acid ester groups; sulfonic acid groups; sulfonic acid ester groups; nitro groups; cyano groups; alkyl groups; alkenyl groups; alkynyl groups; cycloalkyl groups (including poly-fused-ring cycloalkyl and polycycloalkyl groups); aryl groups (including hydroxyl substituted aryl, such as phenol, and including poly-fused-ring aryl); aralkyl groups; amine groups, such as —$N(R_{11'})(R_{12'})$ where $R_{11'}$ and $R_{12'}$ are each independently selected, with some embodiments, from hydrogen, linear or branched $C_1$-$C_{20}$ alkyl, $C_3$-$C_{12}$ cycloalkyl, and aryl, or $R_{11'}$ and $R_{12'}$ together form an alkyl ring.

The term "alkyl" as used herein, in accordance with some embodiments, means linear or branched alkyl, such as but not limited to, linear or branched $C_1$-$C_{25}$ alkyl, or linear or branched $C_1$-$C_{10}$ alkyl, or linear or branched $C_2$-$C_{10}$ alkyl. Examples of alkyl groups from which the various alkyl groups of the present invention can be selected from, include, but are not limited to, those recited further herein. Alkyl groups, with some embodiments of the present invention, include one or more unsaturated linkages selected from —CH═CH— groups and/or one or more —C≡C— groups, provided the alkyl group is free of two or more conjugated unsaturated linkages. With some embodiments, the alkyl groups are free of unsaturated linkages, such as —CH═CH— groups and —C≡C— groups.

The term "cycloalkyl" as used herein, in accordance with some embodiments, means groups that are appropriately cyclic, such as but not limited to, $C_3$-$C_{12}$ cycloalkyl (including, but not limited to, cyclic $C_5$-$C_7$ alkyl) groups. Examples of cycloalkyl groups include, but are not limited to, those recited further herein. The term "cycloalkyl" as used herein in accordance with some embodiments also includes: bridged ring polycycloalkyl groups (or bridged ring polycyclic alkyl groups), such as but not limited to, bicyclo[2.2.1]heptyl (or norbornyl) and bicyclo[2.2.2]octyl; and fused ring polycycloalkyl groups (or fused ring polycyclic alkyl groups), such as, but not limited to, octahydro-1H-indenyl, and decahydronaphthalenyl.

The term "aryl," as used herein, in accordance with some embodiments, includes but is not limited to $C_5$-$C_{18}$ aryl, such as but not limited to $C_5$-$C_{10}$ aryl (including fused ring polycyclic aryl groups).

The term "aralkyl," as used herein, and in accordance with some embodiments, includes but is not limited to $C_6$-$C_{24}$ aralkyl, such as but not limited to $C_6$-$C_{10}$ aralkyl, and means an aryl group substituted with an alkyl group. Examples of aralkyl groups include, but are not limited to, benzyl, and phenethyl.

Representative alkyl groups include but are not limited to methyl, ethyl, propyl, isopropyl, butyl, isobutyl, sec-butyl, tert-butyl, pentyl, neopentyl, hexyl, heptyl, octyl, nonyl and decyl. Representative alkenyl groups include but are not limited to vinyl, allyl and propenyl. Representative alkynyl groups include but are not limited to ethynyl, 1-propynyl, 2-propynyl, 1-butynyl, and 2-butynyl. Representative cycloalkyl groups include but are not limited to cyclopropyl, cyclobutyl, cyclopentyl, cyclohexyl, and cyclooctyl substituents. Representative aryl groups include but are not limited to phenyl, naphthyl, anthracenyl, phenanthrenyl, and tetracenyl (including structural isomers thereof).

The term "alkylene" as used herein, and in accordance with some embodiments, means linear or branched divalent alkyl. The description provided above with regard to the term "alkyl" is applicable to the term "alkylene" including examples of representative alkyl groups.

All documents, such as but not limited to issued patents and patent applications, referred to herein, and unless otherwise indicated, are to be considered to be "incorporated by reference" in their entirety.

The treatment composition, in the method of the present invention, is formed by any appropriate methods. The components of the treatment composition can be added together in any appropriate sequence. With some embodiments, the treatment composition is formed by mixing the components thereof in a vessel with concurrent agitation, such as provided by an impeller and/or fluid jets. The treatment composition is formed, with some embodiments, by passing the components thereof through one or more static mixers. The treatment composition, with some embodiments, is stored in a vessel, such as a tank and/or tanker truck, and subsequently used in the contacting step. With some further embodiments, the treatment composition is formed and concurrently used in the contacting step, as it is formed. With some further embodiments of the present invention, the treatment composition is formed by combining together at least two separate packages, such as, but not limited to: a first package that includes the acid functional material, and optionally at least a portion of the water, and a surfactant; and a second package that includes an oxidizer and optionally a portion of the water.

With some additional embodiments of the present invention, at least a portion of the treatment composition is formed in situ with the landfill residue. For purposes of non-limiting illustration, one or more components of the treatment composition are added, in any order and/or combination, to an aqueous medium (such as, but not limited to, landfill leachate) in which the landfill residue resides, with some embodiments.

The treatment composition formed in situ may be formed by adding at least one treatment package to a landfill leachate in fluid communication with the landfill residue, wherein the at least one treatment pack comprises a first treatment package comprising: (i) an acid functional material, (ii) optionally water, (iii) optionally the oxidizer comprising a reactive oxygen, and (iv) optionally the surfactant. The treatment composition may be formed in situ by adding at least two separate packages to the landfill leachate in fluid communication with the landfill residue. For example, the treatment composition may comprise a first treatment package comprising: (i) an acid functional material, (ii) optionally water, (iii) optionally an oxidizer comprising a reactive oxygen, and (iv) optionally a surfactant, and a second treatment package comprising: (i) optionally an acid functional material, (ii) optionally water, (iii) an oxidizer comprising a reactive oxygen, and (iv) optionally a surfactant. The two treatment packages may be introduced contemporaneously, sequentially, or sequentially with a waiting period before addition of the second treatment package. The additions may be continuous or sporadic. For example, the first treatment package and second treatment package may be pre-mixed and introduced together or not pre-mixed and introduced together. For example, the first treatment package may be introduced followed shortly after (e.g., seconds or minutes later) by introduction of the second treatment package. For example, the first treatment package may be introduced and may be allowed to reside for a first residence period, and the second treatment composition may then be added following the first residence period and may be allowed to reside for a second residence period. The first treatment composition may be still present during the second residence period. The first residence period may be, for example, at least 30 minutes, such as at least 1 hour, such as at least 4 hours, such as at least 8 hours, such as at least 12 hours, such as at least 18 hours, such as at least 24 hours, such as at least 30 hours, such as at least 36 hours, such as at least 42 hours, such as at least 48 hours, such as at least 72 hours, or longer. The second residence period may be, for example, at least 30 minutes, such as at least 1 hour, such as at least 4 hours, such as at least 8 hours, such as at least 12 hours, such as at least 18 hours, such as at least 24 hours, such as at least 30 hours, such as at least 36 hours, such as at least 42 hours, such as at least 48 hours, such as at least 72 hours, or longer.

In accordance with some embodiments of the present invention, the organic substance, of the landfill residue, includes an extracellular polymeric substance, and at least a portion of the landfill residue is solid at the conditions at which the landfill leachate collection system or the landfill gas extraction system operate (e.g., at a temperature from 10° C. to 99° C., such as 25° C.) and at which it is contacted by the treatment composition. The conditions under which the landfill leachate collection system or the landfill gas extraction system operate will vary depending upon the type of landfill and other factors. The extracellular polymeric substance includes, with some embodiments, polymers that are biosynthesized by microorganisms, such as bacteria, within the landfill. The extracellular polymeric substance, with some embodiments, typically includes polysaccharides, and at least one of proteins, enzymes, or deoxyribonucleic acid (DNA), which can be referred to as extracellular DNA (or exDNA). With some embodiments, the extracellular polymeric substance includes metal crosslinks, such as between polymeric portions thereof. The extracellular polymeric substance, with some further embodiments, forms or defines a matrix in which the microorganisms, such as bacteria, are embedded and/or reside.

With some embodiments, at least a portion of the landfill residue is solid and optionally has a rubbery or rubber-like consistency at the operating conditions of the landfill; and optionally a portion of the landfill residue is a viscous fluid, which can have a slimy consistency. With some further embodiments, at least a portion of the landfill residue is a porous solid, and the landfill residue has a sponge-like consistency at the operating conditions of the landfill.

Contacting together the treatment composition and the landfill residue is conducted with an application method comprising at least one of spray application of the treatment composition, static immersion application of the treatment composition, flow application of the treatment composition, or pressurized application of the treatment composition. With spray application, and in accordance with some embodiments, the treatment composition is sprayed onto and/or over the landfill residue. Spray application methods include, with some embodiments, high pressure jet spray application. With static immersion application, and in accordance with some embodiments, the landfill residue is immersed statically in the treatment composition. With flow application, and in accordance with some embodiment, the treatment composition is flowed over the landfill residue.

With each of the application methods, the landfill residue is free standing and/or associated with a surface of a substrate, such as abutting against and/or adhered to the surface of a substrate. The substrate, with some embodiments includes, but is not limited to: a pipe, such as a landfill gas extraction pipe and/or a landfill leachate pipe; and/or a sump that is in fluid communication with a landfill gas extraction pipe and/or a landfill leachate pipe. The surface of the substrate with which the landfill residue is associated, with some embodiments, includes: an interior surface of a pipe, such as the interior surface of a landfill gas extraction pipe and/or a landfill leachate pipe; and/or an interior surface of a sump that is in fluid communication with a landfill gas extraction pipe; and/or equipment and/or elements in and/or associated with a sump and/or pipe, such as, but not limited to, pumps, screens, the exterior surface of the pipe, the grit chamber, the force main of the leachate collection system, gravel packing, and/or waste material.

Contacting together the treatment composition and the landfill residue is conducted under any suitable conditions. With some embodiments, contacting together the treatment composition and the landfill residue is conducted at a temperature of from ambient temperature to a temperature that is less than the boiling point of the treatment composition, such as from ambient temperature to 99° C., or from 10° C. to 99° C., or from 15° C. to 99° C., or from 20° C. to 99° C., or from 25° C. to 99° C. With some embodiments, contacting together the treatment composition and the landfill residue is conducted under ambient pressure or elevated pressure, such as from 14.7 pounds per square inch (psi) to 20,000 psi (such as in the case of high pressure jet application methods), or from 14.7 psi to 1000 psi. Added pressure may assist in forcing the treatment composition beyond the wellbore, gas extraction pipe, and/or landfill leachate collection system such that the treatment composition contacts landfill residue present on the exterior surface of the pipe, the grit chamber, gravel packing, and/or waste material.

Contacting together the treatment composition and the landfill residue results in the formation of a modified treatment composition that includes at least a portion of the landfill residue. The modified treatment composition, with some embodiments, includes the landfill residue in a form selected from dissolved landfill residue, suspended landfill residue, and combinations thereof. The suspended landfill residue, within the modified treatment composition, and in accordance with some embodiments, is solid suspended landfill residue.

The treatment composition and the modified treatment composition, with some embodiments, are each independently flowable. With some further embodiments, the treatment composition and the modified treatment composition are each an independently a flowable fluid.

The modified treatment composition removed in the method of the present invention is, with some embodiments, stored and/or subjected to further treatment such as, but not limited to: settling; filtering; precipitation; pH adjustment; dilution; microbial digestion; evaporation; sanitization; and combinations of two or more thereof. With some embodiments, a solid material is isolated from the modified treatment composition, and with some further embodiments, the isolated solid material is pyrolyzed or placed in a landfill.

The landfill residue, with some embodiments, resides within an interior of a landfill gas extraction pipe that extends beneath a surface of a landfill, and the landfill residue is the landfill gas extraction residue, and the method of the present invention further includes introducing the treatment composition into the interior of the landfill gas extraction pipe, wherein the treatment composition contacts the landfill gas extraction residue within the interior of the landfill gas extraction pipe.

Contact of the treatment composition with the landfill gas extraction residue within the interior of the landfill gas extraction pipe results in formation of the modified treatment composition. The modified treatment composition is removed from the landfill gas extraction pipe.

The landfill gas extraction pipe, with some embodiments, includes a wellhead that resides above the surface of said landfill, and the method of the present invention further includes introducing the treatment composition through the wellhead and into the interior of the landfill gas extraction pipe, wherein the treatment composition contacts the landfill gas extraction residue within the interior of the landfill gas extraction pipe.

With some embodiments of the present invention: the treatment composition is introduced continuously and/or intermittently into the landfill gas extraction pipe; and the modified treatment composition is removed continuously and/or intermittently from the landfill gas extraction pipe. The treatment composition, with some embodiments, is poured into and/or pumped into the landfill gas extraction pipe. The modified treatment composition, with some embodiments, is pumped out of the landfill gas extraction pipe.

With some embodiments, the treatment composition is introduced into the landfill gas extraction pipe, and allowed to reside within the landfill gas extraction pipe for a period of time (residence period), such as from 30 minutes to 72 hours or longer, during which time the modified treatment composition is formed within the landfill gas extraction pipe. For example, the residence time may be at least 30 minutes, such as at least 1 hour, such as at least 4 hours, such as at least 8 hours, such as at least 12 hours, such as at least 18 hours, such as at least 24 hours, such as at least 30 hours, such as at least 36 hours, such as at least 42 hours, such as at least 48 hours, such as at least 72 hours, or longer. After completion of the residence period, the modified treatment composition, with some embodiments, is removed from the landfill gas extraction pipe and stored and/or subjected to further treatment, such as described above.

The treatment composition may be added as at least two separate packages. For example, the treatment composition may comprise a first treatment package comprising: (i) an acid functional material, (ii) optionally water, (iii) optionally an oxidizer comprising a reactive oxygen, and (iv) optionally a surfactant, and a second treatment package comprising: (i) optionally an acid functional material, (ii) optionally water, (iii) an oxidizer comprising a reactive oxygen, and (iv) optionally a surfactant. The two treatment packages may be introduced into the landfill gas extraction pipe contemporaneously, sequentially, or sequentially with a waiting period before addition of the second treatment package. The additions may be continuous or sporadic. For example, the first treatment package and second treatment package may be pre-mixed and introduced into the landfill gas extraction pipe together. For example, the first treatment package may be introduced into the landfill gas extraction pipe first followed shortly after (e.g., seconds or minutes later) by introduction of the second treatment package into the landfill gas extraction pipe. For example, the first treatment package may be introduced into the landfill gas extraction pipe first and may be allowed to reside in the landfill gas extraction pipe for a first residence period, and the second treatment composition may then be added following the first residence period and may be allowed to reside in the landfill gas extraction pipe for a second residence period. The first treatment composition may be still present in the landfill gas extraction pipe during the second residence period. The first residence period may be, for example, at least 30 minutes, such as at least 1 hour, such as at least 4 hours, such as at least 8 hours, such as at least 12 hours, such as at least 18 hours, such as at least 24 hours, such as at least 30 hours, such as at least 36 hours, such as at least 42 hours, such as at least 48 hours, such as at least 72 hours, or longer. The second residence period may be, for example, at least 30 minutes, such as at least 1 hour, such as at least 4 hours, such as at least 8 hours, such as at least 12 hours, such as at least 18 hours, such as at least 24 hours, such as at least 30 hours, such as at least 36 hours, such as at least 42 hours, such as at least 48 hours, such as at least 72 hours, or longer.

The method of the present invention, with some embodiments, includes removing the modified treatment composition from the interior of the landfill gas extraction pipe, and introducing into the interior of the landfill gas extraction pipe, (i) at least a portion of the modified treatment composition, or (ii) a combined treatment composition including a combination of the modified treatment composition and the treatment composition.

The landfill gas extraction pipe, with some embodiments, has a lower end that is in fluid communication with a sump that resides beneath the surface of the landfill, and the landfill gas extraction residue also resides within the sump, the method further includes introducing the treatment composition into the sump, wherein the treatment composition contacts the landfill gas extraction residue within the sump. With some embodiments, a liquid such as landfill leachate is collected within and removed from the sump, such as through a separate sump pipe. Collection of landfill leachate within and removal of landfill leachate from the sump minimizes or prevents landfill leachate from moving up through the landfill gas extraction pipe. The presence of landfill leachate within the landfill gas extraction pipe can interfere with the collection and removal of landfill gas from the landfill gas extraction pipe.

The landfill leachate pipe may have a lower end that is in fluid communication with a sump that resides beneath the surface of the landfill, and the landfill residue may also be present in the sump. The method may further comprise introducing the treatment composition into the sump, wherein the treatment composition contacts the landfill residue within the sump.

The landfill residue, with some embodiments, resides within an interior of a landfill leachate pipe that extends beneath a surface of a landfill, and the landfill residue is the landfill leachate collection residue, and the method of the present invention further includes introducing the treatment composition into the interior of the landfill leachate pipe, wherein the treatment composition contacts the landfill leachate collection residue within the interior of the landfill leachate pipe.

Contact of the treatment composition with the landfill leachate collection residue within the interior of the landfill leachate pipe results in formation of the modified treatment composition. The modified treatment composition may be removed from the landfill leachate pipe.

The landfill leachate pipe, with some embodiments, includes a head (or wellhead, cleanout, union, etc.) that resides above the surface of said landfill, and the method of the present invention further includes introducing the treatment composition through the head/wellhead and into the interior of the landfill leachate pipe, wherein the treatment composition contacts the landfill leachate collection residue within the interior of the landfill leachate pipe.

With some embodiments of the present invention: the treatment composition is introduced continuously and/or intermittently into the landfill leachate pipe; and the modified treatment composition is removed continuously and/or intermittently from the landfill leachate pipe. The treatment composition, with some embodiments, is poured into and/or pumped into the landfill leachate pipe. Added pressure may assist in forcing the treatment composition beyond the wellbore such that the treatment composition contacts landfill residue present on the exterior surface of the pipe, the gravel packing, and/or waste material, as well as any other landfill residue nearby. As an alternative to or in addition to pressurization, a vacuum may be applied to the landfill leachate pipe in order to assist in movement of the treatment composition and/or modified treatment composition through the landfill leachate pipe. The modified treatment composition, with some embodiments, may be pumped out of the landfill leachate pipe. The modified treatment composition, with some embodiments, may vacuum assisted out of the landfill leachate pipe.

With some embodiments, the treatment composition is introduced into the landfill leachate pipe, and allowed to reside within the landfill leachate pipe for a period of time (residence period), such as from 30 minutes to 72 hours or longer, during which time the modified treatment composition is formed within the landfill leachate pipe from contact with landfill residue. For example, the residence period may be at least 30 minutes, such as at least 1 hour, such as at least 4 hours, such as at least 8 hours, such as at least 12 hours, such as at least 18 hours, such as at least 24 hours, such as at least 30 hours, such as at least 36 hours, such as at least 42 hours, such as at least 48 hours, such as at least 72 hours, or longer. After completion of the residence period, the modified treatment composition may be removed from the landfill leachate pipe and stored and/or subjected to further treatment, such as described above.

The treatment composition may be added as one or at least two separate packages. For example, the treatment composition may comprise a first treatment package comprising: (i) an acid functional material, (ii) optionally water, (iii) optionally an oxidizer comprising a reactive oxygen, and (iv) optionally a surfactant, and a second treatment package comprising: (i) optionally an acid functional material, (ii) optionally water, (iii) an oxidizer comprising a reactive oxygen, and (iv) optionally a surfactant. The two treatment packages may be introduced into the landfill leachate pipe contemporaneously, sequentially, or sequentially with a waiting period between the addition of the first and second treatment package. The additions may be continuous or sporadic. For example, the first treatment package and second treatment package may be pre-mixed and introduced into the landfill leachate pipe together. For example, the first treatment package may be introduced into the landfill leachate pipe first followed shortly after (e.g., seconds or minutes later) by introduction of the second treatment package into the landfill leachate pipe. For example, the first treatment package may be introduced into the landfill gas extraction pipe first and may be allowed to reside in the landfill leachate pipe for a first residence period, and the second treatment composition may then be added following the first residence period and may be allowed to reside in the landfill leachate pipe for a second residence period. The first treatment composition may be still present in the landfill leachate pipe during the second residence period. The first residence period may be, for example, at least 30 minutes, such as at least 1 hour, such as at least 4 hours, such as at least 8 hours, such as at least 12 hours, such as at least 18 hours, such as at least 24 hours, such as at least 30 hours, such as at least 36 hours, such as at least 42 hours, such as at least 48 hours, such as at least 72 hours, or longer. The second residence period may be, for example, at least 30 minutes, such as at least 1 hour, such as at least 4 hours, such as at least 8 hours, such as at least 12 hours, such as at least 18 hours, such as at least 24 hours, such as at least 30 hours, such as at least 36 hours, such as at least 42 hours, such as at least 48 hours, such as at least 72 hours, or longer.

The method of the present invention, with some embodiments, includes removing the modified treatment composition from the interior of the landfill leachate pipe, and introducing into the interior of the landfill leachate pipe, (i) at least a portion of the modified treatment composition, or (ii) a combined treatment composition including a combination of the modified treatment composition and the treatment composition.

The acid functional material may comprise any suitable material comprising an acid functional group or salts thereof. As used herein, "acid functional group" refers to Brønsted-Lowry acids that capable of donating a proton. The acid functional groups shall include such Brønsted-Lowry acids in protonated or deprotonated form, including the salts thereof. The acid functional material may comprise carboxylic acid functional materials, phosphoric acid functional materials, phosphonic acid functional materials, or salts thereof. The acid functional material may comprise a poly-acid functional material. As used herein, a "poly-acid functional material" refers to a compound or polymer having at least two acid-functional groups. The acid functional groups may comprise, for example, carboxylic acid, phosphoric acid, phosphonic acid, phosphinic acid, or combinations thereof, as well as the salt thereof.

The acid functional material may comprise a carboxylic acid functional material, such as, for example, a polycarboxylic acid functional material. Non-limiting examples of the carboxylic acid functional materials of the method and treatment compositions of the present invention, include: (a) malonic acid, succinic acid, adipic acid, citric acid, tartaric acid, malic acid, glutaric acid, gluconic acid, glucoheptonic acid, glutamic acid, glycolic acid, salicyclic acid, aspartic acid, oxalic acid; (b) an aminopolycarboxylic acid including at least one of nitrilotriacetic acid, alkylenediaminetetraacetic acid, dialkylenetriaminepentaacetic acid, N-(hydroxyalkyl)-alkylenediaminetriacetic acid, L-glutamic acid-N,N-diacetic acid, alkylene glycol-bis(2-aminoalkylether)-N,N,N',N'-tetraacetic acid, iminodiacetic acid, alkylenediamine-N,N'-disuccinic acid, alkylenediamine-N,N'-bis(2-hydroxyphenylacetic acid), iminodisuccinic acid, N,N'-bis(2-hydroxybenzyl)alkylenediamine diacetic acid, or alkylglycinediacetic acid; (c) a carboxylic acid functional polymer, including at least one carboxylic acid group, prepared from carboxylic acid functional monomers including at least one of acrylic acid, methacrylic acid, vinyl acetic acid, allyl acetic acid, fumaric acid, maleic acid, maleic anhydride, itaconic acid, alpha-halo acrylic acid, or beta-carboxyethyl acrylic acid; (d) a carboxylic acid functional polyester, comprising at least one carboxylic acid group, prepared from carboxylic acid functional monomers comprising at least one of malonic acid, succinic acid, citric acid, tartaric acid, malic acid, glutaric acid, adipic acid, esters thereof, or anhydrides thereof; (e) polyaspartic acid; (f) polysuccinimide; or (g) salts of each thereof. The polycarboxylic acids may have a number average molecular weight of from 50 to 10,000 g/mol, such as 50 to 5,000 g/mol, such as from 50 to 1,000 g/mol, such as from 50 to 500 g/mol, such as from 50 to 250 g/mol, such as from 50 to 200 g/mol, as measured by GPC using polystyrene calibration standards.

With some embodiments of the present invention, the aminopolycarboxylic acid, of the carboxylic acid functional materials of the treatment composition, includes at least one of nitrilotriacetic acid, ethylenediaminetetraacetic acid, diethylenetriaminepentaacetic acid, N-(hydroxyethyl)-ethylenediaminetriacetic acid, L-glutamic acid-N,N-diacetic acid, ethylene glycol-bis(2-aminoethylether)-N,N,N',N'-tetraacetic acid, iminodiacetic acid, ethylenediamine-N,N'-disuccinic acid, ethylenediamine-N,N'-bis(2-hydroxyphenylacetic acid), hexamethylenediaminetetraacetic acid, iminodisuccinic acid, N,N'-bis(2-hydroxybenzyl)ethylenediamine diacetic acid, or methylglycinediacetic acid.

The carboxylic acid functional polymer, including at least one carboxylic acid group, prepared from carboxylic acid functional monomers including at least one of acrylic acid, methacrylic acid, vinyl acetic acid, allyl acetic acid, fumaric acid, maleic acid, maleic anhydride, itaconic acid, alpha-halo acrylic acid, or beta-carboxyethyl acrylic acid, with some embodiments includes at least one monomer that is free of carboxylic acid functionality. Classes of monomers that are free of carboxylic acid functionality, from which the carboxylic acid functional polymer can be prepared, include, but are not limited to: alkyl (meth)acrylates; cycloalkyl (meth)acrylates; and aryl (meth)acrylates. Examples of monomers that are free of carboxylic acid functionality, from which the carboxylic acid functional polymer can be prepared, include, but are not limited to: methyl (meth)acrylate, ethyl (meth)acrylate, propyl (meth)acrylate, isopropyl (meth)acrylate, butyl (meth)acrylate, isobutyl (meth)acrylate, tert-butyl (meth)acrylate, 2-ethylhexyl (meth)acrylate, lauryl (meth)acrylate, isobornyl (meth)acrylate, cyclohexyl (meth)acrylate and 3,3,5-trimethylcyclohexyl (meth)acrylate. The carboxylic acid functional polymer is, with some embodiments, prepared in accordance with art-recognized polymerization methods, such as, but not limited to, free radical polymerization, and living polymerization, such as atom transfer radical polymerization methods. With some embodiments, the carboxylic acid functional polymer, prepared from radically polymerizable monomers, has a Mw of from 150 to 500,000 or from 1000 to 50,000.

The carboxylic acid functional polyesters, from which the carboxylic acid functional materials of the treatment composition, can be selected, are typically prepared from, in addition to the carboxylic acid functional monomers, polyols, which include at least two hydroxyl groups. Classes of polyols from which the carboxylic acid functional polyesters can be prepared include, but are not limited to: hydroxyl functional alkyl monomers; hydroxyl functional cycloalkyl monomers; and hydroxyl functional aryl monomers, which in each case include at least two hydroxyl groups. Examples of polyols from which the carboxylic acid functional polyesters can be prepared include, but are not limited to: glycerin, trimethylolpropane, trimethylolethane, trishydroxyethylisocyanurate, pentaerythritol, ethylene glycol, propylene glycol, trimethylene glycol, 1,3-, 1,2- and 1,4-butanediols, pentane diols (such as, but not limited to, 1,5-pentane diol), heptanediol, hexanediol, octanediol, 4,4'-(propane-2,2-diyl)dicyclohexanol, 4,4'-methylenedicyclohexanol, neopentyl glycol, 2,2,3-trimethylpentane-1,3-diol, 1,4-dimethylolcyclohexane, 2,2,4-trimethylpentane diol, 4,4'-(propane-2,2-diyl)diphenol, 4,4'-methylenediphenol, and like polyols. With some embodiments, the carboxylic acid functional polyester has a Mw of from 150 to 500,000 or from 400 to 10,000.

The salts of each of the carboxylic acid functional materials, from which the acid functional materials of the treatment composition can be selected, are formed from, or include, with some embodiments: alkali metals (such as, but not limited to, lithium, sodium, and potassium cations); and/or alkaline earth metals (such as, but not limited to, magnesium and calcium cations).

The phosphoric acid functional materials, from which the acid functional materials of the treatment composition can be selected, include, with some embodiments, at least one of: hypophosphorous acid, phosphorous acid, orthophosphoric acid, polyphosphoric acid, derivatives thereof, or salts of each thereof. The salts of the phosphoric acid functional materials, from which the acid functional materials of the treatment composition can be selected, are formed from, or include, with some embodiments: alkali metals (such as, but not limited to, lithium, sodium, and potassium cations); and/or alkaline earth metals (such as, but not limited to, magnesium and calcium cations); and/or ammonium groups.

The phosphonic acid functional materials, from which the acid functional materials of the treatment composition can be selected, include, with some embodiments, at least one of: hydroxyphosphonoacetic acid, diethylenetriaminepenta (methylenephosphonic acid), hexamethylenediaminetetra-(methylenephosphonic acid), 2-phosphono-1,2,4-tricarboxylic acid butane, amino tri-(methylene phosphonic acid), hydroxyethylidenediphosphonic acid, phosphonosuccinic acid, benzene phosphonic acid, 2-aminoethyl phosphonic acid, ethylenediamine tetra(methylene phosphonic acid), hydroxyethylamino-di(methylene phosphonic acid), bis (hexamethylenetriaminepenta(methylenephosphonic acid), phosphinecarboxylic acids, or salts of each thereof. The salts of the phosphonic acid functional materials, from which the acid functional materials of the treatment composition can be selected, are formed from, or include, with some embodiments: alkali metals (such as, but not limited to, lithium, sodium, and potassium cations); and/or alkaline earth metals (such as, but not limited to, magnesium and calcium cations).

The acid functional material optionally may be present in the treatment composition or treatment packages in an at least partially neutralized form. For example, the acid functional material may be added to an aqueous medium that is preceded by or followed by the addition of a neutralizing agent, such as, for example, caustic soda (sodium hydroxide), caustic potash (potassium hydroxide), or any other suitable material. Alternatively, the acid functional material may be in a solid or partially solid salt form that can be added to the leachate. For example, the acid functional material may comprise a salt with a cation, such as, for example, an alkali metal such as lithium, sodium, potassium, and the like, and/or alkaline earth metals such as, magnesium, calcium, and the like.

The treatment composition may have any suitable pH. For example, the treatment composition may have a pH of at least 1, such as at least 3, such as at least 5.5, such as at least 6, such as at least 6.5, such as at least 7, such as at least 8, such as at least 8.5. The treatment composition may have a pH of no more than 13, such as no more than 10, such as no more than 8.5, such as no more than 8, such as no more than 7.5, such as no more than 7, such as no more than 6.5. The treatment composition may have a pH of 1 to 13, such as 1 to 10, such as 1 to 8.5, such as 1 to 8, such as 1 to 7.5, such as 1 to 7, such as 1 to 6.5, such as 3 to 13, such as 3 to 10, such as 3 to 8.5, such as 3 to 7.5, such as 3 to 7, such as 3 to 6.5, such as 5.5 to 13, such as 5.5 to 10, such as 5.5 to 8.5, such as 5.5 to 8, such as 5.5 to 7.5, such as 5.5 to 7, such as 5.5 to 6.5, such as 6 to 13, such as 6 to 10, such as 6 to 8.5, such as 6 to 8, such as 6 to 7.5, such as 6 to 7, such as 6 to 6.5, such as 7 to 13, such as 7 to 10, such as 7 to 8.5, such as 7 to 8, such as 7 to 7.5, such as 7.5 to 13, such as 7.5 to 10, such as 7.5 to 8.5, such as 7.5 to 8, such as 8 to 8.5. The pH may be at least partially modified by an optional pH modifier (e.g., acid, base, or buffer).

The optional oxidizer of the treatment composition of the present invention includes at least one reactive oxygen. As used herein, the term "reactive oxygen" with regard to the oxidizer, means an oxygen that is capable of engaging in an oxidative reaction. With some embodiments, the optional oxidizer of the treatment composition includes at least one peroxy linkage (—O—O—) and/or at least one salt of a peroxy linkage (—O—O—).

The oxidizer of the treatment composition of the present invention includes, with some embodiments, at least one of hydroperoxides, peroxycarboxylic acids, peroxycarboxylic acid salts, peroxycarboxylic acid esters, peroxysulfuric acid, peroxysulfuric acid salts, perphosphoric acid, perphosphoric acid salts, perboric acid, perboric acid salts, metal peroxides, percarbonic acid, percarbonic acid salts, dialkyl peroxides, dicycloalkyl peroxides, alkyl-cycloalkyl peroxides, diaryl peroxides, alkyl-aryl peroxides, cycloalkyl-aryl peroxides, diacylperoxides, or urea hydrogen peroxide.

The hydroperoxides of the treatment composition, with some embodiments, include at least one of:

$H_2O_2$; or $R^1$—OOH, where $R^1$ is an alkyl group, a substituted alkyl group, a cycloalkyl group, a substituted cycloalkyl group, an aryl group, or a substituted aryl group.

With some further embodiments, $R^1$, of $R^1$—OOH, is a $C_1$-$C_{10}$ alkyl group, a $C_3$-$C_8$ cycloalkyl group, or phenyl.

The peroxycarboxylic acids, and the peroxycarboxylic acids of the peroxycarboxylic acid salts, each independently include, with some embodiments, at least one of:

$R^2$—C(O)OOH, where $R^2$ is an alkyl group, a substituted alkyl group, a cycloalkyl group, a substituted cycloalkyl group, an aryl group, or a substituted aryl group.

With some further embodiments, $R^2$, of $R^2$—C(O)OOH, is a $C_1$-$C_{10}$ alkyl group, a $C_3$-$C_8$ cycloalkyl group, or phenyl.

The salts of the oxidizer, such as peroxycarboxylic acid salts, peroxysulfuric acid salts, perphosphoric acid salts, perboric acid salts, and percarbonic acid salts, are with some embodiments each independently formed from (or include) alkali metals (such as, but not limited to, lithium, sodium, and potassium cations) and/or alkaline earth metals (such as, but not limited to, magnesium and calcium cations).

The metal of the metal peroxides from which the oxidizer can be selected include, is with some embodiments selected from: alkali metals (such as, but not limited to, lithium, sodium, and potassium); alkaline earth metals (such as, but not limited to, magnesium, calcium, and barium); and transition metals (such as, but not limited to, manganese, zinc, cadmium, chromium, and molybdenum).

Dialkyl peroxides, dicycloalkyl peroxides, and alkyl-cycloalkyl peroxides from which the oxidizer can be selected are, with some embodiments, represented by the following Formula (I):

$$R^3—O—O—R^4 \quad (I)$$

For dialkyl peroxides represented by Formula (I), $R^3$ and $R^4$ are each independently selected from an alkyl group or a substituted alkyl group. With some embodiments, $R^3$ and $R^4$ of the dialkyl peroxide are each independently a $C_1$-$C_{10}$ alkyl group.

For dicycloalkyl peroxides represented by Formula (I), $R^3$ and $R^4$ are each independently selected from a cycloalkyl group and a substituted cycloalkyl group. With some embodiments, $R^3$ and $R^4$ of the dicycloalkyl peroxide are each independently a $C_3$-$C_8$ cycloalkyl group.

For dialkyl-cycloalkyl peroxides represented by Formula (I), $R^3$ is selected from an alkyl group or a substituted alkyl group, and $R^4$ is selected from a cycloalkyl group and a substituted cycloalkyl group. With some embodiments, $R^3$ of the dialkyl-cycloalkyl peroxide is a $C_1$-$C_{10}$ alkyl group, and $R^4$ is a $C_3$-$C_8$ cycloalkyl group.

Diaryl peroxides, alkyl-aryl peroxides, and cycloalkyl-aryl peroxides from which the oxidizer can be selected are, with some embodiments, represented by the following Formula (II):

$$R^5—O—O—R^6 \quad (II)$$

For diaryl peroxides represented by Formula (II), $R^5$ and $R^6$ are each independently selected from an aryl group or a substituted aryl group. With some embodiments, $R^5$ and $R^6$ of the diaryl peroxide are each independently selected from phenyl, naphthyl, and anthracenyl.

For alkyl-aryl peroxides represented by Formula (II), $R^5$ is an alkyl group or a substituted alkyl group, and $R^6$ is an aryl group or a substituted aryl group. With some embodiments, $R^5$ of the alkyl-aryl peroxide is a $C_1$-$C_{10}$ alkyl group, and $R^6$ is selected from phenyl, naphthyl, and anthracenyl.

For cycloalkyl-aryl peroxides represented by Formula (II), $R^5$ is a cycloalkyl group or a substituted cycloalkyl group, and $R^6$ is an aryl group or a substituted aryl group. With some embodiments, $R^5$ of the alkyl-aryl peroxide is a $C_1$-$C_{10}$ alkyl group, and $R^6$ is selected from phenyl, naphthyl, and anthracenyl.

Diacylperoxides from which the oxidizer can be selected are, with some embodiments, represented by the following Formula (III):

(III)

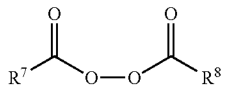

With reference to Formula (III), $R^7$ and $R^8$ are, with some embodiments, each independently selected from hydrogen, an alkyl group, a substituted alkyl group, a cycloalkyl group, a substituted cycloalkyl group, an aryl group, or a substituted aryl group. With some further embodiments, $R^7$ and $R^8$ of Formula (III) are each independently selected from hydrogen, a $C_1$-$C_{10}$ alkyl group, a $C_3$-$C_8$ cycloalkyl group, phenyl, naphthyl, and anthracenyl.

The substituents of the substituted alkyl groups, substituted cycloalkyl group, and substituted aryl groups of the oxidizers are, with some embodiments, in each case independently selected from those groups described previously herein with regard to "substituted groups." With some further embodiments, the substituents of the substituted alkyl groups, substituted cycloalkyl group, and substituted aryl groups of the oxidizers are in each case independently selected from halo groups (e.g., F, Cl, I, and Br), hydroxyl groups, ether groups, thiol groups, thio ether groups, alkyl groups, cycloalkyl groups, and aryl groups.

The surfactant of the treatment composition, with some embodiments, is an organic surfactant selected from cationic surfactants, anionic surfactants, non-ionic surfactants, amphoteric surfactants, and combinations of two or more thereof.

Classes of cationic surfactants include, but are not limited to, amine-based cationic surfactants and quaternary ammonium cationic surfactants. Amine-based cationic surfactants include, with some embodiments, an amine group selected from primary amines, secondary amines, tertiary amines, and combinations thereof, in which, with some embodiments, the amine group is positively charged depending on the pH of the medium in which the amine-based surfactant resides. Quaternary ammonium cationic surfactants include, with some embodiments, one or more quaternary ammonium groups, which are typically in the form of quaternary ammonium salts.

Classes of anionic surfactants include, but are not limited to, those which include an anionic group selected from carboxylate groups, sulfate groups, sulfonate groups, phosphate groups, and combinations thereof. A further class of anionic surfactants include polyalkylene oxides, which include an anionic group selected from carboxylate groups, sulfate groups, sulfonate groups, phosphate groups, and combinations thereof. The anionic polyalkylene oxides include, with some embodiments, residues (or monomer units) selected from ethylene oxide, propylene oxide, and butylene oxide, and combinations thereof. With some further embodiments, the anionic polyalkylene oxides are block copolymer polyalkylene oxides including residues (or monomer units) selected from at least two of ethylene oxide, propylene oxide, and butylene oxide.

Classes of nonionic surfactants include, but are not limited to, those which are free of ionic groups, such as anionic groups and cationic groups, and include one or more hydroxyl groups. A further class of nonionic surfactants include polyalkylene oxides, which include one or more hydroxyl groups. The nonionic polyalkylene oxides include, with some embodiments, residues (or monomer units) selected from ethylene oxide, propylene oxide, and butylene oxide, and combinations thereof. With some further embodiments, the nonionic polyalkylene oxides are block copolymer polyalkylene oxides including residues (or monomer units) selected from at least two of ethylene oxide, propylene oxide, and butylene oxide. A still further class of nonionic surfactants include amine oxides, such as ether amine oxides, which can have a non-ionic form in neutral and alkaline pH.

Amphoteric surfactants which can be used in the methods and compositions of the present invention include, with some embodiments, both acidic and basic hydrophilic moieties within the structure thereof. Classes of amphoteric surfactants include, but are not limited to, derivatives of imidazoline, betaines, and derivatives of betaines, such as sulfobetaines. Amphoteric surfactants useful in the methods and compositions of the present invention include, with some embodiments, at least one tertiary amine (as the basic hydrophilic moiety) and at least one carboxylic acid (as the acidic hydrophilic moiety).

Classes and examples of cationic surfactants, anionic surfactants, non-ionic surfactants, and amphoteric surfactants, including commercial sources thereof, which can be used in the methods and compositions of the present invention are described in further detail in *McCutcheon's Emulsifiers and Detergents*, Volume 1, North American Edition, 2018, MC Publishing Company.

With some embodiments, the surfactant of the treatment composition includes at least one of: alkanolamides; polyoxyethylene derivatives of sorbitan esters; sorbitan monooleate; sorbitan monostearate; $C_6$-$C_{22}$ linear or branched alkyl ethoxylates having 1 to 30 oxyethylene units; $C_6$-$C_2$ linear or branched alkyl propoxylates having 1 to 30 oxypropylene units; $C_6$-$C_{22}$ linear or branched alkyl ethoxylates/propoxylates having 1 to 30 combined oxyethylene and propoxylate units; alkylaryl ethoxylates containing a $C_6$-$C_2$ aryl group and having 1 to 30 oxyethylene units; hexadecyl sodium phthalate; cetyl sodium phthalate; stearyl sodium phthalate; ethylene oxide condensates of fatty acid amides; alpha olefin sulfonates; ether sulfates; ether sulfonates; alkyl sulfates; alkyl aryl sulfates; alkyl sulfonates; alkyl aryl sulfonates; betaines; sulfobetaines; sultaines; alkyl amines; ether amines; alkoxylated amines; sarcosinates; alkyl iminodipropionates; alkyl amphoacetates; alkyl polyglycosides; propylene oxide-ethylene oxide block copolymers; sulfosuccinates; amine oxides; quaternary ammonium compounds; or salts of each thereof.

A class of amphoteric surfactants from which the surfactants of the treatment composition can be selected, includes, but is not limited to, N-(alkoxyalkylene)-N,N-(alkylenecarboxylic acid) amines. With some embodiments, N-(alkoxyalkylene)-N,N-(alkylenecarboxylic acid) amine are represented by the following Formula (IV):

(IV)

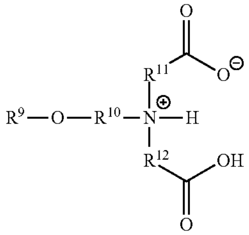

With reference to Formula (IV), $R^9$ is alkyl, and $R^{10}$, $R^{11}$, and $R^{12}$ are each independently selected from alkylene. With some embodiments, $R^9$ is a $C_1$-$C_{10}$ alkyl; and $R^{10}$, $R_{11}$, and $R^{12}$ are each independently selected from $C_1$-$C_{10}$ alkylene.

Examples of N-(alkoxyalkyene)-N,N-(alkylenecarboxylic acid) amines from which the surfactants of the treatment composition can be selected, include, but are not limited to, TOMAMINE AMPHOTERIC 12 and TOMAMINE AMPHOTERIC 400, which are both commercially available from Evonik Corporation.

A class of quaternary amines from which the surfactants of the treatment composition can be selected, includes, but is not limited to, N-(alkoxyalkylene)-N,N-(alkylenehydroxy)-N-alkyl ammonium halides. With some embodiments, the N-(alkoxyalkylene)-N,N-(alkylenehydroxy)-N-alkyl ammonium halides are represented by the following Formula (V):

(V)

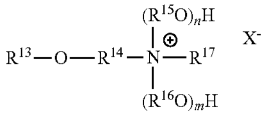

With reference to Formula (V), $R^{13}$ and $R^{17}$ are each independently selected from alkyl; $R^{14}$, $R^{15}$ and $R^{16}$ are each independently selected from alkylene; n and m are each independently from 1 to 50; and $X^-$ is a halide ion. With some embodiments, $R^{13}$ and $R^{17}$ are each independently selected from $C_1$-$C_{10}$ alkyl; and $R^{14}$, $R^{15}$ and $R^{16}$ are each independently selected from $C_1$-$C_{10}$ alkylene.

Examples of N-(alkoxyalkylene)-N,N-(alkylenehydroxy)-N-alkyl ammonium halides from which the surfactants of the treatment composition can be selected, include, but are not limited to, TOMAMINE Q-14-2 and TOMAMINE Q-17-2, which are both commercially available from Evonik Corporation.

A class of amine oxides from which the surfactants of the treatment composition can be selected, includes, but is not limited to, N-(alkoxyalkylene)-N,N-(alkylenehydroxy) amine oxides. With some embodiments, the N-(alkoxyalkylene)-N,N-(alkylenehydroxy) amine oxides are represented by the following Formula (VI):

(VI)

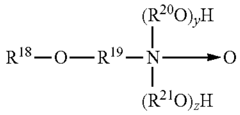

With reference to Formula (VI). $R^{18}$ is alkyl; $R^{19}$, $R^{20}$ and $R^{21}$ are each independently selected from alkylene; and y and z are each independently from 1 to 50. With some embodiments, $R^{18}$ is $C_1$-$C_{10}$ alkyl; and $R^{19}$, $R^{20}$ and $R^{21}$ are each independently selected from $C_1$-$C_{10}$ alkylene.

Examples of N-(alkoxyalkylene)-N,N-(alkylenehydroxy) amine oxides from which the surfactants of the treatment composition can be selected, include, but are not limited to, TOMAMINE AO-405 and TOMAMINE AO-455, which are both commercially available from Evonik Corporation.

With some embodiments of the present invention, for the treatment composition: the acid functional material is present in an amount of from 5 percent by weight to 60 percent by weight, or from 10 percent by weight to 55 percent by weight, or from 15 percent by weight to 50 percent by weight; the oxidizer is optionally present in an amount of from 3 percent by weight to 50 percent by weight, or from 8 percent by weight to 45 percent by weight, or from 13 percent by weight to 40 percent by weight; the surfactant is optionally present in an amount of from 0.1 percent by weight to 10 percent by weight, or from 0.5 percent by weight to 8 percent by weight, or from 0.8 percent by weight to 6 percent by weight; and water is present in an amount of from 35 percent by weight to 95 percent by weight, or from 40 percent by weight to 90 percent by weight, or from 45 percent by weight to 85 percent by weight, wherein the percent weights are in each case based on total weight of the treatment composition.

The landfill residue optionally includes a scale-forming salt. The scale-forming salt, with some embodiments, includes at least one of metal carbonate, metal sulfate, metal phosphate, metal phosphonate, metal oxalate, metal oxide, metal hydroxide, or metal halide. The metal of each scale-forming salt is, with some embodiments, selected from: alkali metals (such as, but not limited to, lithium, sodium, and potassium); alkaline earth metals (such as, but not limited to, magnesium, calcium, and barium); and transition metals (such as, but not limited to, iron, manganese, zinc, and chromium). The halide of the metal halide, with some embodiments, is selected from F, Cl, Br, or I.

The present invention also relates to a treatment composition that removes a landfill residue, in which the treatment composition includes: (i) an acid functional material including at least one of carboxylic acid functional materials, phosphoric acid functional materials, phosphonic acid functional materials, or salts thereof; and (ii) an oxidizer including a reactive oxygen. The landfill residue is selected from a landfill gas extraction residue and a landfill leachate collection residue, and the landfill residue includes an organic substance and optionally a scale-forming salt. The acid functional material and oxidizer of the treatment composition are each independently as described previously herein with regard to the method of the present invention. The landfill gas extraction residue and the landfill leachate collection residue are each independently as described previously herein. The landfill residue, including the organic substance and optional scale-forming salt thereof, are each independently as described previously herein.

The treatment composition, with some embodiments, has a tablet form, or a particulate form. The treatment composition can be formed into tablets in accordance with art-recognized methods, such as, but no limited to, using a tablet press. When in a particulate form, the treatment composition can be, with some embodiments, a free flowing particulate treatment composition.

When in the form of a tablet, the treatment composition optionally includes, with some embodiments, a binder, such as, but not limited to: one or more polysaccharide binders; one or more polyvinylpyrrolidone binders; one or more polyvinyl acetate binders; one or more polyalkylene glycol ether binders; and/or one or more alkaline earth metal carboxylate binders.

With some embodiments, the tablets of the treatment composition of the present invention can have any desirable shape and dimension. The treatment composition tablets of the present invention have, with some further embodiments, a disk-like shape with: a height of from 15 to 50 mm, or from 20 to 40 mm, or from 22 to 35 mm, such as 28 mm; and a diameter of from 3 to 10 cm, or from 4 to 8 cm, or from 5 to 7 cm, such as 6.7 cm.

With some embodiments of the treatment composition of the present invention: (i) the acid functional material is present in an amount of from 5 percent by weight to 95 percent by weight, or from 10 percent by weight to 90 percent by weight, or from 15 percent by weight to 85 percent by weight; and (ii) the oxidizer is present in an amount of from 5 percent by weight to 95 percent by weight, or from 10 percent by weight to 90 percent by weight, or from 15 percent by weight to 85 percent by weight, where the percent weights, in each case, are based on the total weight of the acid functional material and the oxidizer.

With some further embodiments of the present invention, the treatment composition further includes: (iii) water; and (iv) optionally a surfactant. The surfactant is as described previously herein.

The treatment composition of the method the present invention and according to the present invention, with some embodiments, includes one or more additives. Classes of additives that can optionally be present in the treatment composition include, but are not limited to: antifoam agents; corrosion inhibitors; biocides; peroxide catalysts; peroxide activators; pH modifiers (including acids, bases, and buffers); and combinations of two or more thereof. Peroxide catalysts include, but are not limited to, transition metal compounds, such as transition metal sulfates, such as ferrous sulfate and copper sulfate. Peroxide activators include, but are not limited to, alkanoylamines, such as tetraalkanoylalkylenediamine, such as tetraacetylethylenediamine. The optional additives can, with some embodiments, each be independently present in an amount of from 0.01 percent by weight to 10 percent by weight, or from 0.1 to 5 percent by weight, the percent weights in each case being based on the total weight of the treatment composition.

The present invention is more particularly described in the following examples, which are intended to be illustrative only, since numerous modifications and variations therein will be apparent to those skilled in the art. Unless otherwise specified, all parts and all percentages are by weight.

EXAMPLES

In the following examples, methods and treatment compositions according to the present invention are demonstrated. The landfill residue used in the following examples was obtained from a landfill gas extraction pipe. In Part-1, the treatment of landfill residue in tap water with treatment compositions including an acid functional material and water according to the present invention are demonstrated. In Part-2, the treatment of landfill residue in a synthetic landfill leachate with treatment compositions including synthetic landfill leachate according to the present invention are demonstrated. In Part-3, treatment compositions according to the present invention are formed in water and then combined with synthetic landfill leachate and landfill residue.

Part-1

The treatment of landfill residue in tap water with treatment compositions including 6 percent by weight of an acid functional material and water are demonstrated in this Part-1 of the Examples. The following procedure was employed in preparing the treatment compositions and the evaluation thereof as summarized in Table 1. An appropriate amount of acid functional material was added to 100 grams of tap water in a beaker so as to provide a treatment composition that included 6 percent by weight of the acid functional material. The pH of the treatment composition was next adjusted to 7 using sodium hydroxide (50% in water). Thirty grams of the pH adjusted treatment composition was added to a 50 ml centrifuge tube. A one gram solid chunk of landfill residue was added to the pH adjusted treatment composition in the centrifuge tube. Visual observations were made periodically over a period of 72 hours after adding the landfill residue to the pH adjusted treatment composition in the centrifuge tube, which are summarized in the following Table 1.

TABLE 1

| Example | Acid Functional Material | Observations |
|---|---|---|
| C-1 | None (Control) | After 72 hours, the landfill residue had swelled considerably with no powder having been formed. |
| 1 | Hydroxyethylidene diphosphonic acid (etidronic acid) | Overnight, 90% of the landfill residue dissolved, with the remaining 10% swelled. After 72 hours, only a fine powder remained. |
| 2 | Citric acid | Overnight the landfill residue partially dissolved with the remainder swelled. After 72 hours, only a fine powder remained. |
| 3 | Aminotris(methylenephosphonic acid) | Overnight the landfill residue partially dissolved with the remainder swelled. After 72 hours, only a fine powder remained. |
| 4 | Glutamic diacetic acid | Overnight the landfill residue partially dissolved with the remainder swelled. After 72 hours, only a fine powder remained. |

Part-2

The treatment of landfill residue in synthetic landfill leachate with various treatment compositions that also include synthetic landfill leachate is demonstrated in Part-2. The synthetic leachate composition used in these evaluations is summarized in the following Table 2.

TABLE 2

| Synthetic Landfill Leachate Composition | |
|---|---|
| Component | Concentration (g/L) |
| Sodium bicarbonate | 1.8 |
| Fulvic acid (soluble powder) | 10.0 |
| Acetic acid (glacial) | 20.0 |
| Calcium chloride | 4.6 |
| Magnesium chloride hexahydrate (flake) | 4.4 |
| Potassium chloride | 2.1 |
| Sodium sulfate (anhydrous) | 2.2 |

TABLE 2-continued

| Synthetic Landfill Leachate Composition | |
|---|---|
| Component | Concentration (g/L) |
| Iron (II) chloride tetrahydrate | 0.2 |
| Deionized water | 987.5 |
| Sodium hydroxide (50%) | As required to obtain a pH of 7. |

The synthetic landfill leachate as summarized in Table 2 was prepared as follows. Deionized water was added to a beaker. Acetic acid and fulvic acid were added to the beaker followed by mixing with a magnetic stir bar for 10 minutes. Calcium chloride, magnesium chloride, potassium chloride, sodium sulfate, and ferrous chloride were next added to the beaker, followed by mixing for 10 minutes. The pH was adjusted to 5.0 to 5.5 by the addition of sodium hydroxide (50% in water). Sodium bicarbonate was added to the beaker. The pH was adjusted to 6.8 to 7.3 with the further addition of sodium hydroxide (50% in water), followed by mixing for 10 minutes. Every two weeks, any remaining synthetic landfill leachate from the previous batch was disposed of, and a new batch of synthetic landfill leachate was prepared and used.

Part-2(a)

The treatment of landfill residue in synthetic landfill leachate with treatment compositions including 6 percent by weight of an acid functional material and synthetic landfill leachate are demonstrated in Part-2(a). The following procedure was employed in preparing the treatment compositions and the evaluation thereof as summarized in Table 3. An appropriate amount of acid functional material was added to 100 grams of synthetic landfill leachate in a beaker so as to provide a treatment composition that included 6 percent by weight of the acid functional material. The pH of the treatment composition was next adjusted to 7 using sodium hydroxide (50% in water). Thirty grams of the pH adjusted treatment composition was added to a 50 ml centrifuge tube. A one gram solid chunk of landfill residue was added to the pH adjusted treatment composition in the centrifuge tube. Visual observations were made periodically over a period of 72 hours after adding the landfill residue to the pH adjusted treatment composition in the centrifuge tube, which are summarized in the following Table 3.

TABLE 3

| Example | Acid Functional Material | Observations |
|---|---|---|
| C-2 | None (Control) | After 72 hours, the landfill residue had swelled slightly with no powder having been formed. |
| 5 | Aminotris(methylene-phosphonic acid) | After 72 hours, only a small amount of fine powder remained. |
| 6 | Citric acid | After 72 hours, only a small amount of fine powder remained. |
| 7 | Diethytriamine penta(acetic acid) | After 72 hours, only a small amount of fine powder remained. |
| 8 | Diethylenetriamine penta(methylene phosphonic acid | After 72 hours, only a small amount of fine powder remained. |
| 9 | 2-phosphonobutane-1,2,4- tricarboxylic acid | After 72 hours, only a small amount of fine powder remained. |

Part-2(b)

The treatment of landfill residue in synthetic landfill leachate with treatment compositions including 6 percent by weight of an acid functional material, 3 percent by weight of hydrogen peroxide, and synthetic landfill leachate are demonstrated Part-2(b). The following procedure was employed in preparing the treatment compositions and the evaluation thereof as summarized in Table 4. An appropriate amount of acid functional material was added to 100 grams of synthetic landfill leachate in a beaker so as to provide a treatment composition that included 6 percent by weight of the acid functional material. The pH of the treatment composition was next adjusted to 7 using sodium hydroxide (50% in water). Thirty grams of the pH adjusted treatment composition was added to a 50 ml centrifuge tube. A 1.5 gram solid chunk of landfill residue was added to the pH adjusted treatment composition in the centrifuge tube. Next, 3 ml of hydrogen peroxide (30% in water) was added to the centrifuge tube. Visual observations of the contents of the centrifuge tubes were then made periodically over a period of 72 hours, which are summarized in the following Table 4.

TABLE 4

| Example | Acid Functional Material | Observations |
|---|---|---|
| C-3[(1)] | None (Control) | Initially a large amount of foam was generated. The landfill residue became lighter in color after 48 hours. Some hard pieces remained after 72 hours. |
| 10 | Aminotris(methyl-enephosphonic acid) | After 24 hours the landfill residue was soft and swollen. After 48 hours the landfill residue broke into small pieces with agitation[(a)]. After 72 hours, only a small amount of fine powder remained. |
| 11 | Diethylenetriamine penta(acetic acid) | After 24 hours the landfill residue was soft and swollen. After 48 hours the landfill residue didnot break up into small pieces with agitation[(a)]. After 72 hours, only a small amount of finepowder remained. |
| 12 | 2-phosphonobutane-1,2,4-tricarboxylic acid | After 24 hours the landfill residue was soft and swollen. After 48 hours the landfill residue did not break up into small pieces with agitation[(a)]. After 72 hours, only a small amount of fine powder remained. |
| 13 | Citric acid | After 24 hours the landfill residue was soft and swollen. After 48 hours the landfill residue broke into small pieces with agitation[(a)]. After 72 hours, only a small amount of fine powder remained. The liquid in the centrifuge tube was dark in color (the other samples were not dark in color). |
| 14 | Diethylenetriamine penta(methylene phosphonic acid) | After 24 hours the landfill residue was soft and swollen. After 48 hours the landfill residue did not break up into small pieces with agitation[(a)]. After 72 hours, only a small amount of fine powder remained. |

[(1)]Control-3 (C-3) included 3 percent by weight of hydrogen peroxide in synthetic landfill leachate, but no acid functional material.
[(a)]Agitation was provided by gently swirling the centrifuge tube by hand.

Part-2(c)

Example 15

The treatment of landfill residue in synthetic landfill leachate with a treatment composition (Example 15) including 6 percent by weight of aminotris(methylenephosphonic acid), 6 percent by weight of sodium percarbonate, and synthetic landfill leachate are demonstrated in Part-2(c). The following procedure was employed in preparing this treatment composition. An appropriate amount of aminotris (methylenephosphonic acid) was added to 500 grams of synthetic landfill leachate in a beaker so as to provide a treatment composition that included 6 percent by weight of aminotris(methylenephosphonic acid). Thirty grams of the treatment composition was added to a 50 ml centrifuge tube. A 1.5 gram solid chunk of landfill residue was added to the treatment composition in the centrifuge tube. Next, an appropriate amount of sodium percarbonate was added to the centrifuge tube so as to provide a treatment composition including 6 percent by weight of sodium percarbonate.

Visual observations of the contents of the centrifuge tube over a period of 48 hours are summarized as follows. During the initial five minutes after addition of the sodium percarbonate to the centrifuge tube, foam was generated. After 24 hours, the pH of the contents of the centrifuge tube was 5.7, and a large portion of the solid chunk of landfill residue was present along with some fine solids. After 48 hours, substantially all of the solid chunk of landfill residue had broken into soft small particles.

Part 2(d)

The treatment of landfill residue in synthetic landfill leachate with treatment compositions including 6 percent by weight of aminotris(methylenephosphonic acid), 3 percent by weight of hydrogen peroxide, various amounts of surfactant (shown in Table 5), and synthetic landfill leachate are demonstrated in Part-2(d).

The following procedure was employed in preparing the treatment compositions and the evaluation thereof as summarized in Table 5. An appropriate amount of aminotris (methylenephosphonic acid) was added to 500 grams of synthetic landfill leachate in a beaker so as to provide a treatment composition that included 6 percent by weight of aminotris(methylenephosphonic acid). The pH of the treatment composition was next adjusted to 7 using sodium hydroxide (50% in water). Thirty grams of the pH adjusted treatment composition was added to a 50 ml centrifuge tube. A 1.5 gram solid chunk of landfill residue was added to the pH adjusted treatment composition in the centrifuge tube. Next, 3 ml of hydrogen peroxide (30% in water) was added to the centrifuge tube. Finally, an appropriate amount of surfactant was added to the centrifuge tube to provide the concentrations (in percent by weight) recited in Table 5. Visual observations of the contents of the centrifuge tubes were then made periodically over a period of 48 hours, which are summarized in the following Table 5.

Part-3

Treatment compositions containing water were separately prepared in the absence of synthetic landfill leachate, and then combined with synthetic landfill leachate and a solid chunk of landfill residue in Part 3.

The treatment compositions I-IV are summarized in the following Table 6, in which the amount of each component as recited is in percent by weight.

TABLE 6

| | Component | | | |
|---|---|---|---|---|
| | I | II | III | IV |
| Aminotris(methylenephosphonic acid) (50% in water) | 44.4 | 31.8 | 0 | 0 |
| 2-phosphonobutane-1,2,4-tricarboxylic acid (50% in water) | 0 | 0 | 43.4 | 0 |
| Citric acid (50% in water) | 0 | 0 | 0 | 43.5 |
| NaOH(5) | 15.6 | 11.4 | 13.6 | 15.5 |
| $H_2O_2$ (30% in water) | 33.0 | 18.0 | 33.0 | 33.0 |
| TOMAMINE AO-405(6) | 0 | 1.5 | 0 | 0 |
| Water | 7.0 | 37.3 | 10.0 | 8 |

(5)NaOH (50% in water) was added to each treatment composition to provide a final pH of 3.8 to 4.0.

(6)TOMAMINE AO-405 surfactant was obtained commercially from Evonik Corporation.

The treatment compositions as summarized in Table 6 were prepared as follows. Acid functional material and optionally water were added to a beaker, and the pH thereof was adjusted from 3.0 to 8.0 by the addition of NaOH (50% in water). Hydrogen peroxide (30% in water) was added, followed by the addition of surfactant (with Treatment Composition B only). The treatment compositions were mixed with a magnetic stir bar.

The treatment compositions of Table 6 were each evaluated as follows. An appropriate amount of treatment composition was added to 100 grams of synthetic landfill leachate to provide the amounts recited in the following Table 7. Thirty grams of the beaker contents was added to a 50 ml centrifuge tube. A 1.5 gram solid chunk of landfill residue was added to the centrifuge tube. Visual observations of the contents of the centrifuge tubes were then made periodically over a period of 96 hours, which are summarized in the following Table 7.

TABLE 5

| Example | Surfactant | Surfactant Amount (% by weight) | Initial Observations | 48 Hours | 48 Hours + Agitation(4) |
|---|---|---|---|---|---|
| C-4(2) | None (Control) | 0 | A large amount of foam was formed. | The landfill residue was slightly swollen and slightly broken apart. | The landfill residue broke into medium sized pieces. |
| 16 | TOMAMINE AO-405(3) | 1.0 | A small amount foam was formed. | The landfill residue was slightly swollen, soft, and beginning to break apart. | The landfill residue broke apart into small pieces. |
| 17 | TOMAMINE AO-455(3) | 1.0 | A small amount foam was formed. | Same as Ex-16. | Same as Ex-16. |
| 18 | MACAT AO-8-40(3) | 1.25 | Foam formed and quickly collapsed. | Same as C-4. | Same as C-4. |
| 19 | TOMADOL 900(3) | 0.5 | A large amount of foam was formed. | Same as Ex-16. | Same as Ex-16. |

(2)Control-4 (C-4) included 6 percent by weight of aminotris(methylenephosphonic acid) and 3 percent by weight of hydrogen peroxide in synthetic landfill leachate, but no surfactant.

(3)Each of the surfactants was obtained commercially from Evonik Corporation.

(4)Agitation was provided by gently swirling each centrifuge tube by hand.

TABLE 7

| Treatment Composition | Amount of Treatment Composition[7] | 24 Hours | 72 Hours | 96 Hours |
|---|---|---|---|---|
| C-5[8] | 0 | No change in the color of the liquid. The landfill residue had swelled slightly and remained on the bottom of the centrifuge tube. | No change from 24 hours. | Same as 72 hours. |
| I | 26.7 | The liquid was lighter in color. The landfill residue was floating and slightly swollen. A small amount of particles settled to the bottom of the centrifuge tube. | The chunk of landfill residue was gone. A small amount of soft particles additionally settled to the bottom of the centrifuge tube. | Same as 72 hours. |
| II | 25.0 | Same as 1, but more particles formed and settled. | Same as I, but a large amount of soft particles additionally settled to the bottom of the centrifuge tube. | Same as 72 hours. |
| III | 25.0 | The liquid was lighter in color. The landfill residue was floating and swollen. No particles formed. | A small amount of swollen landfill residue remained, which easily broke apart with agitation[9]. | The chunk of landfill residue was gone. The liquid was hazy. No solids/particles formed. |
| IV | 23.0 | Same as III. | The chunk of landfill residue was gone. White granular solids settled to the bottom of the centrifuge tube. | Same as 72 hours. |

[7]The total amount of the treatment composition (including water), in percent by weight, that was added to the combination of synthetic landfill leachate and landfill residue.
[8]The pH of the synthetic landfill leachate was adjusted to a pH of 7 with the addition of NaOH (50% in water), and no treatment composition was added.
[9]Agitation provided by gently swirling the centrifuge tube by hand.

Part 4

Treatment compositions were added to a sample of landfill residue in landfill leachate, allowed to interact, and the amount of solids remaining was compared to the control.

The treatment of landfill residue in landfill leachate from a MSW (municipal solid waste) landfill with treatment compositions including ~6 percent by weight of an acid functional material were evaluated. The following procedure was employed in preparing the treatment compositions described in Table 8 and the evaluation thereof as summarized in Table 9. Various reagents as outlined below were added to 32 grams of MSW landfill leachate and a five-gram solid chunk of landfill residue in a centrifuge tube. The landfill residue, MSW leachate and treatment composition were mixed and allowed to interact for at least 18 hours. Following this time period, the landfill residue, MSW leachate and treatment composition were vacuum filtered through Whatman 113 filters. The mass of material retained by each filter was determined and compared to the control for each treatment composition with the results presented in Table 9.

TABLE 8

| Treatment composition descriptions | |
|---|---|
| **Treatment composition** | **Components** |
| Control | 32 grams of MSW landfill leachate and 5 grams of landfill residue |
| Treatment 1 | 32 grams of MSW landfill leachate, 5 grams of landfill residue, and 7.4 grams of neutralized polycarboxylic acid solution |
| Treatment 2 | 32 grams of MSW landfill leachate, 5 grams of landfill residue, 7.4 grams of neutralized poly carboxylic acid solution and 2 grams of 50% hydrogen peroxide |

TABLE 9

| Treatment | Mass of solids (grams) | Reduction in mass compared to control |
|---|---|---|
| Control | 1.17 | — |
| Treatment 1 | 1.67 | −43% (increase in mass) |
| Treatment 2 | 0.39 | 67% |

The results in Table 9 demonstrate that the addition to polycarboxylic acid in Treatment 1 to the leachate and landfill residue resulted in an increase in mass as the polycarboxylic acid from the swelling of the solids of the leachate and landfill residue, and the addition of hydrogen peroxide with polycarboxylic acid in Treatment 2 resulted in a significant reduction of mass as the leachate and landfill residue solids were dissolved.

The present invention has been described with reference to specific details of particular embodiments thereof. It is not intended that such details be regarded as limitations upon the scope of the invention except insofar as and to the extent that they are included in the accompanying claims.

What is claimed is:

1. A method of removing a landfill residue comprising:

(a) forming a treatment composition comprising, (i) an acid functional material comprising at least one of carboxylic acid functional materials, phosphoric acid functional materials, phosphonic acid functional materials, or salts thereof, (ii) water, (iii) optionally an oxidizer comprising a reactive oxygen, and (iv) optionally a surfactant, (b) contacting together said treatment composition and said landfill residue, wherein said landfill residue is selected from a landfill gas extraction residue and a landfill leachate collection residue, and wherein said landfill residue comprises an organic substance and optionally a scale-forming salt, thereby forming a modified treatment composition comprising said landfill residue; and (c) removing said modified treatment composition.

2. The method of claim 1, wherein the treatment composition is formed by adding at least one treatment package to a landfill leachate in fluid communication with the landfill residue, wherein the at least one treatment package comprises a first treatment package comprising:

(i) the acid functional material, (ii) optionally water, (iii) optionally the oxidizer comprising a reactive oxygen, and (iv) optionally the surfactant, and optionally a second treatment package comprising:

(i) optionally the acid functional material, (ii) optionally water, (iii) the oxidizer comprising a reactive oxygen, and (iv) optionally the surfactant.

3. The method of claim 1, wherein said organic substance, of said landfill residue, comprises an extracellular polymeric substance, and at least a portion of said landfill residue is solid when contacted by the treatment composition.

4. The method of claim 1, wherein said oxidizer comprises at least one of hydroperoxides, peroxycarboxylic acids, peroxycarboxylic acid salts, peroxycarboxylic acid esters, peroxysulfuric acid, peroxysulfuric acid salts, perphosphoric acid, perphosphoric acid salts, perboric acid, perboric acid salts, metal peroxides, percarbonic acid, percarbonic acid salts, dialkyl peroxides, dicycloalkyl peroxides, alkyl-cycloalkyl peroxides, diaryl peroxides, alkyl-aryl peroxides, cycloalkyl-aryl peroxides, diacylperoxides, or urea hydrogen peroxide.

5. The method of claim 1, wherein contacting together said treatment composition and said landfill residue is conducted with an application method comprising at least one of spray application of said treatment composition, static immersion application of said treatment composition, or flow application of said treatment composition.

6. The method of claim 1, wherein contacting together said first treatment composition and the said landfill residue is conducted under an application of pressure.

7. The method of claim 1, wherein contacting together said treatment composition and said landfill residue is conducted at a temperature of from ambient temperature to 99° C.

8. The method of claim 1, wherein said treatment composition and said modified treatment composition are each independently flowable.

9. The method of claim 1, wherein said landfill residue resides on or within a landfill gas extraction pipe, a landfill leachate pipe, a sump in fluid communication with the landfill gas extraction pipe or the landfill leachate pipe, a pump, a screen, a grit chamber, a force main, gravel packing, and/or waste material.

10. The method of claim 1, wherein said landfill residue resides within an interior of a pipe that extends beneath a surface of a landfill, and said method further comprising introducing said treatment composition into said interior of said pipe, wherein said treatment composition contacts said landfill residue within said interior of said pipe.

11. The method of claim 1, wherein said carboxylic acid functional materials comprise at least one of:

malonic acid, succinic acid, adipic acid, citric acid, tartaric acid, malic acid, glutaric acid, gluconic acid, glucoheptonic acid, glutamic acid, glycolic acid, salicyclic acid, aspartic acid, oxalic acid;

an aminopolycarboxylic acid comprising at least one of nitrilotriacetic acid, alkylenediaminetetraacetic acid, dialkylenetriaminepentaacetic acid, N-(hydroxyalkyl)-alkylenediaminetriacetic acid, L-glutamic acid-N,N-diacetic acid, alkylene glycol-bis(2-aminoalkylether)-N,N,N',N'-tetraacetic acid, iminodiacetic acid, alkylenediamine-N,N'-disuccinic acid, alkylenediamine-N,N'-bis(2-hydroxyphenylacetic acid), iminodisuccinic acid, N,N'-bis(2-hydroxybenzyl)alkylenediamine diacetic acid, or alkylglycinediacetic acid;

a carboxylic acid functional polymer, comprising at least one carboxylic acid group, prepared from carboxylic acid functional monomers comprising at least one of acrylic acid, methacrylic acid, vinyl acetic acid, allyl acetic acid, fumaric acid, maleic acid, maleic anhydride, itaconic acid, alpha-halo acrylic acid, or beta-carboxyethyl acrylic acid;

a carboxylic acid functional polyester, comprising at least one carboxylic acid group, prepared from carboxylic acid functional monomers comprising at least one of malonic acid, succinic acid, citric acid, tartaric acid, malic acid, glutaric acid, adipic acid, esters thereof, or anhydrides thereof;

polyaspartic acid;

polysuccinimide; or salts of any thereof.

12. The method of claim 1, wherein said phosphoric acid functional materials is required and comprise at least one of hypophosphorous acid, phosphorous acid, orthophosphoric acid, polyphosphoric acid, or salts of each thereof.

13. The method of claim 1, wherein said phosphonic acid functional materials is required and comprise at least one of hydroxyphosphonoacetic acid, diethylenetriaminepenta(methylenephosphonic acid), hexamethylenediaminetetra-(methylenephosphonic acid), 2-phosphono-1,2,4-tricarboxylic acid butane, amino tri-(methylene phosphonic acid), hydroxyethylidenediphosphonic acid, phosphonosuccinic acid, benzene phosphonic acid, 2-aminoethyl phosphonic acid, ethylenediamine tetra(methylene phosphonic acid), hydroxyethylamino-di(methylene phosphonic acid), bis (hexamethylenetriaminepenta(methylenephosphonic acid), phosphinecarboxylic acids, or salts of each thereof.

14. The method of claim 1, wherein said surfactant is required and comprises at least one of alkanolamides, polyoxyethylene derivatives of sorbitan esters, sorbitan monooleate, sorbitan monostearate, $C_6$-$C_{22}$ linear or branched alkyl ethoxylates having 1 to 30 oxyethylene units, $C_6$-$C_{22}$ linear or branched alkyl propoxylates having 1 to 30 oxypropylene units, $C_6$-$C_{22}$ linear or branched alkyl ethoxylates/propoxylates having 1 to 30 combined oxyethylene and propoxylate units, alkylaryl ethoxylates containing a $C_6$-$C_{22}$ aryl group and having 1 to 30 oxyethylene units, hexadecyl sodium phthalate, cetyl sodium phthalate, stearyl sodium phthalate, ethylene oxide condensates of fatty acid amides, alpha olefin sulfonates, ether sulfates, ether sulfonates, alkyl sulfates, alkyl aryl sulfates, alkyl sulfonates, alkyl aryl sulfonates, betaines, sulfobetaines, sultaines, alkyl amines, ether amines, alkoxylated amines, sarcosinates, alkyl iminodipropionates, alkyl amphoacetates, alkyl polyglycosides, propylene oxide-ethylene oxide block copolymers, sulfosuccinates, amine oxides, quaternary ammonium compounds, or salts of each thereof.

15. The method of claim 1, wherein for said treatment composition, said acid functional material is present in an amount of from 5 percent by weight to 60 percent by weight, said oxidizer is required and is present in an amount of from 3 percent by weight to 50 percent by weight, said surfactant is required and is present in an amount of from 0.1 percent by weight to 10 percent by weight, and water is present in an amount of from 35 percent by weight to 95 percent by weight, wherein the percent weights are in each case based on total weight of said treatment composition.

16. The method of claim 1, wherein said scale-forming salt required and is comprises at least one of metal carbonate, metal sulfate, metal phosphate, metal phosphonate, metal oxalate, metal oxide, metal hydroxide, or metal halide.

17. The method of claim 2, wherein the second treatment package is mandatory, and the first treatment package is added to the landfill leachate form a first treatment composition, and the first treatment composition is contacted with the landfill residue for a first residence period prior to adding the second treatment package to the landfill leachate to form a second treatment composition.

18. The method of claim 4 wherein, said hydroperoxides comprise at least one of, $H_2O_2$, or $R^1$—OOH, wherein $R^1$ is an alkyl group, a substituted alkyl group, a cycloalkyl group, a substituted cycloalkyl group, an aryl group, or a substituted aryl group, and said peroxycarboxylic acids, and the peroxycarboxylic acids of the peroxycarboxylic acid salts, each independently comprise at least one of, $R^2$—C(O)OOH, wherein $R^2$ is an alkyl group, a substituted alkyl group, a cycloalkyl group, a substituted cycloalkyl group, an aryl group, or a substituted aryl group.

19. The method of claim 10, wherein said pipe is a landfill gas extraction pipe comprising a wellhead that resides above said surface of said landfill, and said landfill residue is a landfill gas extraction residue, and said method further comprising introducing said treatment composition through said wellhead and into said interior of said landfill gas extraction pipe.

20. The method of claim 10, wherein said pipe is a landfill gas extraction pipe having a lower end that is in fluid communication with a sump that resides beneath said surface of said landfill, and said landfill gas extraction residue also resides within said sump, said method further comprising introducing said treatment composition into said sump, wherein said treatment composition contacts said landfill gas extraction residue within said sump.

21. The method of claim 10, wherein said pipe is a landfill leachate pipe and said landfill residue is a landfill leachate collection residue.

22. The method of claim 10 further comprising, removing said modified treatment composition from said interior of said pipe, and introducing into said interior of said pipe, (i) at least a portion of said modified treatment composition, or (ii) a combined treatment composition comprising a combination of said modified treatment composition and said treatment composition.

23. The method of claim 17, wherein the first residence period is at least 1 hour.

24. The method of claim 23, wherein the treatment composition comprising the acid functional material is contacted with the landfill residue for a first residence period, and the oxidizer is added to the treatment composition after the first residence period and the treatment composition is contacted with the landfill residue for a second residence period.

* * * * *